United States Patent [19]

Salyer

[11] Patent Number: 5,200,076
[45] Date of Patent: Apr. 6, 1993

[54] EASILY DISASSEMBLED ROTOR SYSTEM

[75] Inventor: David N. Salyer, Garden Grove, Calif.

[73] Assignee: Aquatechnology Resource Management, Long Beach, Calif.

[21] Appl. No.: 866,147

[22] Filed: Apr. 9, 1992

[51] Int. Cl.[5] .............................................. B01D 63/16
[52] U.S. Cl. .................................. 210/321.68; 494/36
[58] Field of Search .................. 210/321.67, 321.68, 210/359, 360.1, 361, 367, 380.1, 232, 234, 322, 323.1, 324, 330, 331, 340, 341, 345–347; 162/384; 494/36, 83, 85

[56] References Cited

U.S. PATENT DOCUMENTS 4,025,425  5/1977  Croopnick et al. ............ 210/321.68

Primary Examiner—Frank Sever
Attorney, Agent, or Firm—Arthur Freilich; Robert D. Hornbaker; Leon D. Rosen

[57] ABSTRACT

A rotary separator is described, of the type which includes membrane packs lying in a rapidly rotating chamber, which provides ready access to the chamber to change or inspect membrane packs, as well as ready access to at least one dynamic seal. The rotary frame includes upper and lower parts (40, 42) forming a chamber (22) between them and held together by bolts. The lower part (42) is rotatably supported by a pair of bearings (60, 62), but the upper part (40) is not directly supported by bearings. A pair of concentric conduits (20, 30) extend through the lower part, but not the upper part (40). The conduits include an inner conduit in the form of a pipe whose top (86) lies slightly within the chamber and which is sealed thereat by a dynamic seal 80. The top part (40) can be readily removed to provide access to the membrane packs (44) and to the inner conduit seal (80).

6 Claims, 1 Drawing Sheet

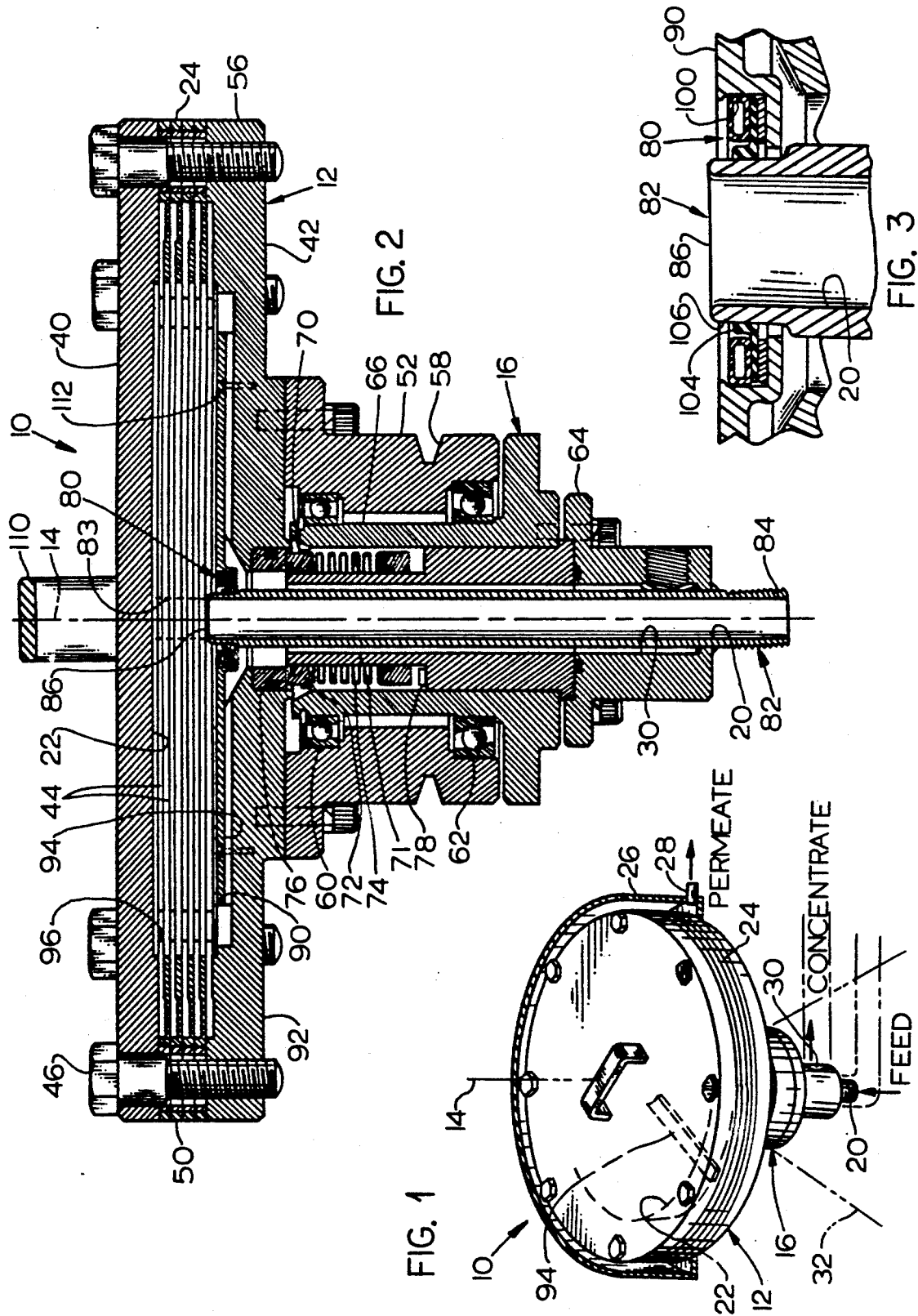

EASILY DISASSEMBLED ROTOR SYSTEM

BACKGROUND OF THE INVENTION

The purification of wastewater or other fluids can be accomplished by the use of membrane packs. Feed fluid such as waste water, is applied under pressure to the outside of the membrane packs. Pure water passes through membranes of the packs into a porous carrier of the packs, and from there to a permeate outlet. The feed fluid, minus some pure water, is disposed of through a concentrate outlet.

It has been found highly advantageous to produce some or all of the pressure of the feed fluid through centrifugal force, by mounting the membrane packs in the chamber of a rotary frame that is rotated at high speed. U.S. Pat. No. 4,132,649 by Croopnick et al describes a purification apparatus of this type. In such an apparatus, a stack of membrane packs is trapped between top and bottom plates held together by bolts, with one plate rotatably mounted on a first bearing and connected to a feed conduit passing through the first bearing, and the other plate rotatably mounted on a second bearing and connected to a concentrate conduit extending through the second bearing. Pure water, or permeate, flies out through the periphery of the rotor to a shroud which gathers it. While such an arrangement can securely rotatably support the rotor, it has been found that such an arrangement can make maintenance difficult.

In actual use of the above-type of purification apparatus, access to the chamber of the rotary frame is required at relatively frequent intervals. For example, a commercial centrifugal purification apparatus may include numerous stacked membranes, and it is possible for a membrane to develop a leak that allows mixing of concentrate and permeate (brackish water and pure water), which requires immediate replacement of the failed membrane pack. In the development of membrane packs, especially for purifying different types of feed fluid, a test structure is required that enables rapid access to the membrane packs to enable frequent inspection and frequent trying out of different membrane packs. Furthermore, low cost dynamic seals which prevent leakage of fluids often need replacement. A rotary purification apparatus which enabled rapid access to the chamber which holds membrane packs or the like, and to dynamic seals, would be of considerable value, particularly in test rotary apparatus, but also in some smaller commercial rotary apparatus for producing fluids that are commercially used.

SUMMARY OF THE INVENTION

In accordance with one embodiment of the present invention, a rotary separator is provided which enables rapid access to the rotary chamber for replacement of membrane packs or the like and/or a rotary seal. The rotary frame has upper and lower parts spaced along its axis of rotation and forming a pressure chamber between them. Upper and lower bearings which rotatably support the rotary frame on a stationary frame, both lie below the upper part of the rotary frame. This leaves the upper part of the rotary frame, which is free of direct rotary support on the stationary frame, free to be detached for access to the rotary chamber, because no bearings have to be removed. The feed and concentrate conduit are concentric and extend through the two bearing and the lower part of the rotary frame to the chamber, to leave the upper part of the frame devoid of direct fluid connection to any stationary structure.

The concentric feed and concentrate conduits are sealed by dynamic seals. The inner one of the two conduits is formed by a pipe whose top lies within the rotary chamber, and which is sealed by a dynamic seal lying within the rotary chamber. As a result, when the top of the rotary frame is removed and the membrane packs are removed from the chamber, the seal for the innermost conduit is exposed and can be readily replaced.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional isometric view of a separation apparatus constructed in accordance with the present invention.

FIG. 2 is a sectional view of the rotary and stationary frames of the separation apparatus of FIG. 1.

FIG. 3 is a sectional view of a portion of the apparatus of FIG. 2.

DESCRIPTION OF THE PREFERRED EMBODIMENT

FIG. 1 illustrates a rotary separator 10 which includes a rotary frame 12 which can rotate about a vertical axis 14 on a stationary frame 16. Feed fluid such as waste water, flows in through an inner conduit 20 to a rotary chamber 22 of the rotary frame, which contains one or more membrane packs. Permeate such as pure water, which passes through membranes of the membrane packs, flies out of the periphery 24 of the rotary chamber. The permeate is captured by a stationary shroud 26 which collects the permeate and allows it to pass out through a permeate outlet 28. Concentrate such as brackish water, which represents feed fluid minus a considerable portion of the permeate, passes out through a concentrate conduit 30. FIG. 1 indicates, in phantom lines, a stand 32 which can support the stationary frame 16.

As shown in FIG. 2, the rotary frame 12 has upper and lower parts 40, 42 which are spaced apart along the rotary axis 14, and which form the rotary chamber 22 between them. A stack of membrane packs, which includes at least one membrane pack 44 lies in the chamber 22. A group of bolt fasteners or bolts 46 hold the upper and lower parts securely together. The particular membrane packs 44 are spaced apart by separators 50 which lie near the periphery of the frame and which are compressed between the upper and lower parts by the bolts 46. Membrane packs of other designs can be used.

The upper part 40 of the rotary frame is primarily in the form of a simple plate. However, the lower part 42 of the rotary frame includes a downwardly-extending portion 52 that extends downwardly from a lower plate 56. The downwardly-extending portion forms a sheave 58 that allows it to be rotated by a belt-driving motor (not shown). The downwardly-extending portion 52 is rotatably supported on the stationary frame 16 by upper and lower bearings 60, 62 which both lie below the upper part 40 of the rotary frame. The stationary frame 16 has a lower part 64 which is supported (as by the stand 32 of FIG. 1), and also includes an upwardly-extending portion 66 that extends upwardly within the downwardly-extending portion 52 of the rotary frame. The bearings 60, 62 are rotatably connected to the downwardly-extending portion 52 of the rotary frame and the upwardly-extending portion 66 of the stationary frame. This arrangement results in the rotary frame being cantilevered, in that only the lower part of the rotary frame is rotatably supported, with the upper part 40 not being directly connected to any bearings. This allows access to the rotary chamber 22, by unscrewing the bolts 46 and lifting off the upper part 40 of the rotary frame. The fact that no bearings have to be removed and replaced, greatly simplifies access to the rotary chamber.

The inner and outer conduits 20, 30 are concentric, and both extend downwardly from the rotary chamber 22. Of course, dynamic seals are required to prevent leakage of fluid between the inner and outer conduits, and from the outer conduit into the environment. An outer conduit dynamic seal 70 is in the form of a face seal and seals a stationary part 71 of the outer conduit 20 (which is part of the stationary frame) to a rotatable part 76 of the outer conduit. The outer dynamic seal includes a lower stationary seal part 72 which is pressed upwardly by a bellows-type spring 74 against a rotary seal part 76 which is part of the rotary frame. This type of dynamic seal seals reliably for an extended period of time, but is expensive and requires disassembly for replacement. A leak sensor 78 senses if any concentrate has leaked past the outer seal, and if so sounds an alarm.

The inner conduit 20 is sealed to the rotary frame by an inner conduit dynamic seal 80. The inner conduit 20 has a stationary part formed by a stationary pipe 82 which has a bottom 84 extending below the outer conduit, and which has a top 86 extending above the outer conduit. The top 86 of the inner conduit pipe lies within the chamber 22, at a height where some of the fluids are flowing primarily radial to the axis 14 instead of just parallel to the axis. The top 86 of the pipe is sealed by the inner dynamic seal 80 to a concentrate plate element 90 which forms a portion of the lower plate 56. Holes 83 in the membrane packs carry feed fluid to spaces between the membrane packs. The lower plate 56 includes a lower plate main element 92 and the concentrate plate element 90 which lies against an upper surface of the lower plate main element. The concentrate plate element 90 has several recesses forming radially-extending passages 94 which carry concentrate to the outer conduit 30. It may be noted that each of the membrane packs 44 has holes 96 aligned with the radial passages 94, to direct fluid that has not passed into the membrane packs, into the concentrate plate passages.

As shown in FIG. 3, the concentrate plate element 90 has a central depression 100 which is designed to receive the inner dynamic seal 80. The seal 80 is held in place by interference fit, while a seal lip 104 seals against the outside surface 106 near the top 86 of the stationary pipe 82. Such radial dynamic seals 80 are readily available at low cost. However, they rapidly wear, such as after perhaps one-hundred hours of use. This can be compared to the more complicated and expensive outer conduit dynamic seal 70 which may last for several months.

To examine or replace membrane packs and to replace the inner dynamic seal 80, an operator merely unscrews all of the bolts 46. The operator then grasps a handle 110 to lift off the upper part 40 of the rotary frame. One or all of the membrane packs 44 can be readily examined and/or lifted off and replaced. With all of the membrane packs lifted off, the operator has access to the upper dynamic seal 80, which can be merely pulled out and replaced by merely pushing down a new seal. Generally, the concentrate plate element 90 is also removed, by unscrewing screws 112 that hold it to the main element 90. This allows for cleanout of the radial passages 94. Due to the relatively slow radially inward movement of concentrate along passages 94 and the centrifugal forces opposing such movement, a lot of particles in the concentrate tend to fall out of solution onto the walls of the passages and clog them. The removable plate element 90 facilitates such cleanout. Assembly of the rotary frame is accomplished in a reverse manner. The fact that the upper part 40 of the rotary frame is devoid of connection to any bearings and is devoid of connection to any conduit (and associated dynamic seals) enables very easy access to the rotary chamber 22.

Although the purification apparatus is especially useful in the testing of membrane packs, it can also be useful for low capacity commercial filtration. This is accomplished by stacking whatever number of packs is required, and using bolts of sufficient length. Of course, too many packs cannot be stacked in the apparatus, or else it may begin to wobble. Wobbling is avoided by increasing the separation between the two bearings 60, 62. It may be noted that the bearings 60, 62 can be replaced by a single very large diameter bearing, although this is usually considerably more costly because of the high speed of balls or other elements of a bearing of large diameter which supports a rotatable frame that rotates at a high speed such as 2,000 rpm for a rotary frame having an outside diameter of about 18 inches.

While the rotary separator has been described as oriented with its axis of rotation vertical, it should be understood that the axis can be horizontal or at other orientations in between, and terms such as "upper" and "lower", etc. are used only to aid in description. Where a large number of membrane packs lie in the rotary frame, it is preferable that the axis of rotation be vertical to minimize sideward loads on the bearings, while if only a small number of membrane packs are to be accommodated, the axis of rotation may be horizontal.

Thus, the invention provides a rotary separator which is especially useful for tests and low to moderate volume separation, which facilitates access to the rotary packs and to at least one of the dynamic seals. This is accomplished by connecting bearings solely to the lower part of the rotary frame and leaving the upper part free of bearing connection. Also, concentric conduits preferably extend through the bearings and the lower part of the rotary frame, leaving the upper part of the rotary frame devoid also of fluid connection. Access to the membrane packs is accomplished by merely detaching fasteners such as by unscrewing bolts, and lifting off an upper plate which forms the upper part of the rotary frame. A dynamic seal which seals to the inner conduit, preferably lies at the bottom of the rotary chamber, so that when the membrane packs are removed, direct access to the inner dynamic seal is provided through the open top of the rotary frame.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A rotary separator, comprising:

a stationary frame having upper and lower portions;

a rotary frame having an axis of rotation and having upper and lower parts spaced along said axis and forming a pressure chamber between them, said rotary frame having a stack of at least one membrane pack lying in said chamber;

upper and lower bearings which are spaced along said axis and which support said rotary frame in rotation on said stationary frame;

means for providing easy access to the region of said membrane pack, including means for enabling both said upper and lower bearings to directly support only said lower rotary frame part on said stationary frame, means for enabling both said upper and lower bearings to lie below said upper rotary part, and means for enabling said upper rotary part to be free of direct rotary support on said stationary frame and to be readily detachable from said lower part.

2. The separator described in claim 1 including:

inner and outer concentric conduits coupled to said pressure chamber and passing through said bearings, each conduit having stationary and rotatable parts;

an inner dynamic seal which seals said stationary and rotatable parts of inner conduit, and a lower dynamic seal which seals said stationary and rotatable parts of said outer conduit;

said stationary part of said inner conduit having a top lying in said chamber, and said inner dynamic seal being sealed to said top.

3. The separator described in claim 2 wherein:

said lower rotary frame part includes a lower plate, said stationary part of said inner conduit extends upwardly through said lower plate, and said inner seal is a radial seal which seals the outside of said stationary portion of said inner conduit to said lower plate, whereby to provide ready access to said upper seal.

4. The separator described in claim 1 including:

at least one membrane pack lying in said chamber and having radially inner and outer portions;

means for carrying feed fluid to said radially inner portion of said membrane pack;

means for carrying concentrate away from said radially outer portion of said membrane pack;

said rotary frame lower part includes a main element and a concentrate plate element lying above said main element, with said elements forming at least one passage therebetween that carries concentrate radially inwardly and forms part of said means for carrying concentrate, with said passage coupled to said radially outer portion of said membrane pack;

said concentrate plate element being detachable from said main element and being upwardly liftable off said main element when said rotatory frame upper part is detached from said lower part.

5. Rotary separation apparatus, comprising:

a rotary frame which can rotate about a vertical axis, said rotary frame having upper and lower parts and forming a sealed chamber between said parts, said lower part having a downwardly-extending portion;

a stationary frame which has a lower part and which has an upwardly-extending portion lying coaxial with said downwardly extending portion, with said portions interfitting so one of said portions lies within the other portion;

upper and lower rotary bearings rotatably connecting said interfitting portions;

said frames forming a plurality of conduits extending downwardly from said chamber and within said bearings;

means for enabling rapid access to said chamber including a plate element coupled to said rotary frame, with said rotary frame having a plurality of fasteners which detachably hold down said plate element to said lower part, said upper part including means for providing an alternative to a direct connection to any external conduit or bearing.

6. The apparatus described in claim 5 wherein:

said upwardly-extending portion of said stationary frame lies within said downwardly-extending portion of said rotary frame, said lower part of said rotary frame forms a downwardly facing surface, said upwardly-extending portion forms a vertical outer conduit and forms a face seal that presses upwardly against said downwardly facing surface;

said stationary inner conduit part includes a stationary pipe lying within said vertical outer conduit and having a top lying higher than said outer conduit and extending into said chamber and sealed to said rotary frame.

* * * * *